United States Patent [19]

Hamano et al.

[11] Patent Number: 4,712,900
[45] Date of Patent: Dec. 15, 1987

[54] APPARATUS FOR CONVERTING INTERCHANGEABLE CAMERA LENS FROM MANUAL INTO AUTOFOCUS

[76] Inventors: Hideo Hamano, C-524, Dai-2 Koporasu, Kibougaoka 144-1, Nakakibougaoka, Asahi-Ku, Kanagawa-Ken; Jun Sugita, 206, Fuji-sou, 4-3-14 Nishi-ikuta, Tama-Ku, Kawasaki-Shi Kanagawa-Ken; Takashi Watanabe, Haimu, Ayabe 2F, 2-25-49 Honmachi, Fuchu-Shi, Tokyo, all of Japan

[21] Appl. No.: 940,546

[22] Filed: Dec. 12, 1986

[30] Foreign Application Priority Data

Dec. 14, 1985 [JP] Japan ................................ 60-280217

[51] Int. Cl.$^4$ ............................................. G03B 3/00
[52] U.S. Cl. ............................ 354/400; 354/195.12; 354/286; 354/455
[58] Field of Search ............... 354/195.1, 195.12, 270, 354/271.1, 286, 295, 400, 402, 451, 455; 352/140-142

[56] References Cited

U.S. PATENT DOCUMENTS 4,627,699 12/1986 Takagi .................................. 354/400

Primary Examiner—L. T. Hix
Assistant Examiner—David M. Gray
Attorney, Agent, or Firm—Stiefel, Gross, Kurland & Pavane

[57] ABSTRACT

An apparatus (X) for converting a manual focus interchangeable lens having an associated focal length into an autofocus type lens for use with a microprocessor based autofocus single lens reflex camera (Y) for providing autofocus photography with the manual focus interchangeable lens includes a lens data conversion and output circuit (SC, MP, 17) which converts data concerning the aperture values of the lens into a serial bit pattern representation of the full/minimum aperture value lens characteristics based on the detected minimum aperture value ($S_1$, $S_2$) and number of stages of aperture values ($S_3$, $S_4$, $S_5$) for the lens. The converter (X) enables a manual focus lens having a different mount (1, 7) than the camera to be mechanically and electrically coupled to the camera to permit autofocus photography. Digital encoders (19) may be employed with the aperture control ring to detect the minimum aperture value and associated number of stages for the lens.

15 Claims, 2 Drawing Figures

APPARATUS FOR CONVERTING INTERCHANGEABLE CAMERA LENS FROM MANUAL INTO AUTOFOCUS

BACKGROUND OF THE INVENTION

1. Field of the Invention

The present invention relates to a converter adapted to be mounted between a camera body and an interchangeable lens and, more particularly, to a converter which is adapted to be mounted between a camera of a type in which the driving of an interchangeable lens is effected in accordance with the result of detection of focal point by the camera body and a manual-focus interchangeable lens having a mounting construction different from that of the camera, so as to enable an automatic-focusing exposure with the manual-focus interchangeable lens.

2. Description of the Prior Art

Autofocus single lens reflex cameras are well known in the art in which an autofocus lens may be interchangeably used with a camera body. On the other hand, Japanese Patent Laid-Open Nos. 28133/1979 and 168023/1983 disclose camera systems in which an existing interchangeable lens and an autofocus camera body are coupled through a converter so as to enable autofocus photography with this interchangeable lens. More specifically, in the camera system shown in Japanese Patent Laid-Open No. 28133/1979, both a focus detection device and a lens driving device are incorporated in the converter, whereas, in the camera system shown in Japanese Patent Laid-Open No. 16802/1983, a focus detection device is provided in the camera body while a lens driving device is incorporated in the converter. However, in both cases, only the interchangeable lenses designed to be used in these camera systems can be used. This causes an inconvenience in that, when a camera having a superior autofocus function is developed and sold, the users cannot adapt their previously obtained interchangeable lenses to the new camera, so that the users cannot fully enjoy the merits of the new camera. These problems are overcome by the present invention.

SUMMARY OF THE INVENTION

An apparatus for converting an interchangeable camera lens from manual into autofocus for use with a single lens reflex camera of the type in which data is exchanged between a camera body and an interchangeable lens, and the focusing lens system of a photographic lens is driven by a driving motor which is driven in accordance with a signal from a focus detection means on the camera body, thereby effecting autofocus photography, comprises means for outputting to the focus detection means on the camera body data necessary for the focus detection and has a lens system which is adapted to be moved along the optical axis by autofocusing driving power derived from the camera body.

More specifically, the converter has a data conversion/output circuit which converts data concerning the interchangeable lens, such as the full aperture value signal and the minimum aperture value signal, into signals corresponding to the system of the camera body and outputs these converted signals to the conventional autofocus system on the camera. The converter also has means for presetting data which cannot be converted by the conversion/output circuit, and has a focus ring with gears and cams which drives the lens system in the converter by the focusing driving power derived from the camera body. The converter further has an auto-arm for converting the operation of the auto-lever on the camera body for controlling the aperture value of the interchangeable lens.

DETAILED DESCRIPTION OF THE INVENTION

Figure 1:
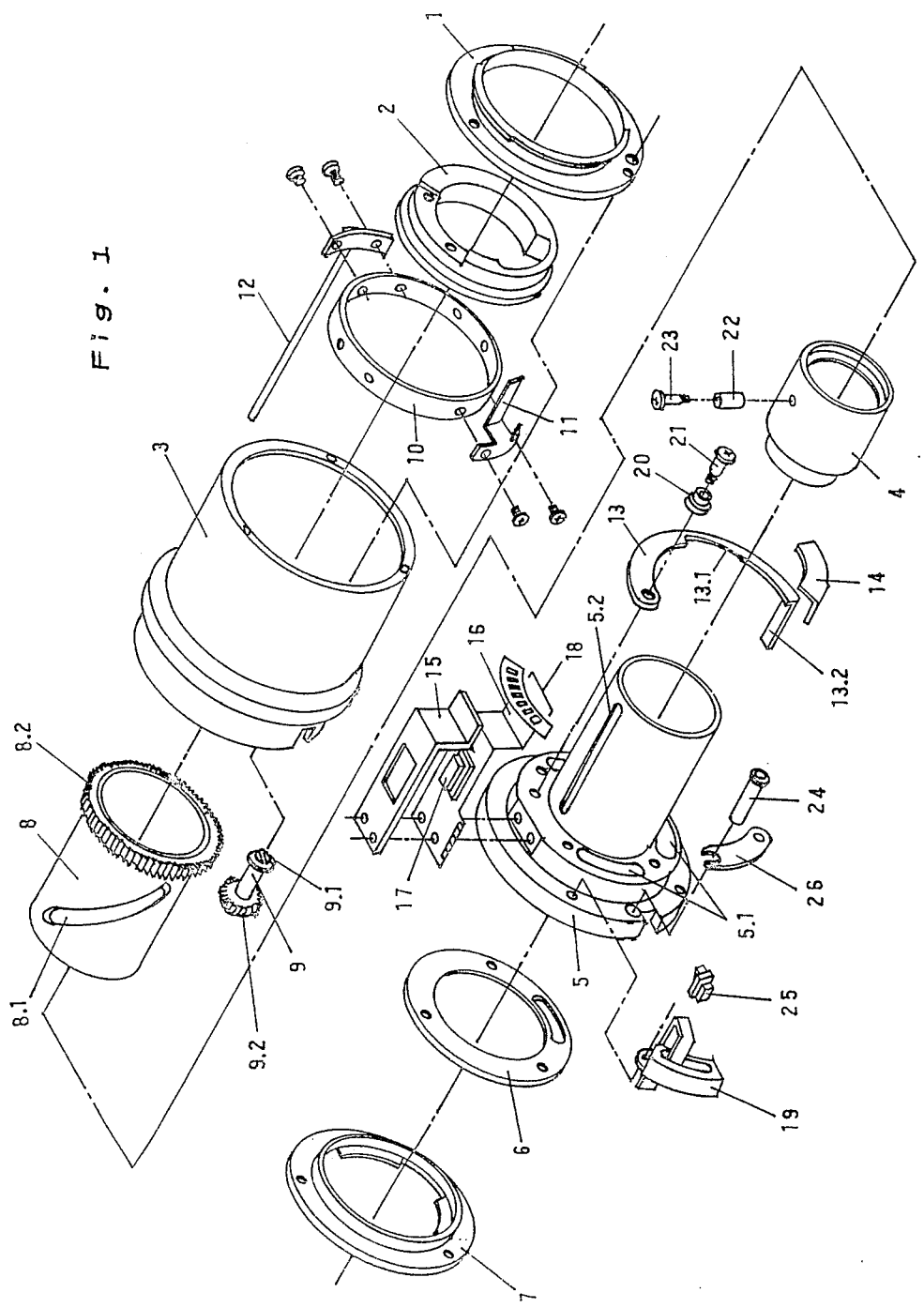
FIG. 1 is an exploded perspective view illustrating the construction of a converter in accordance with the present invention.
Figure 2:
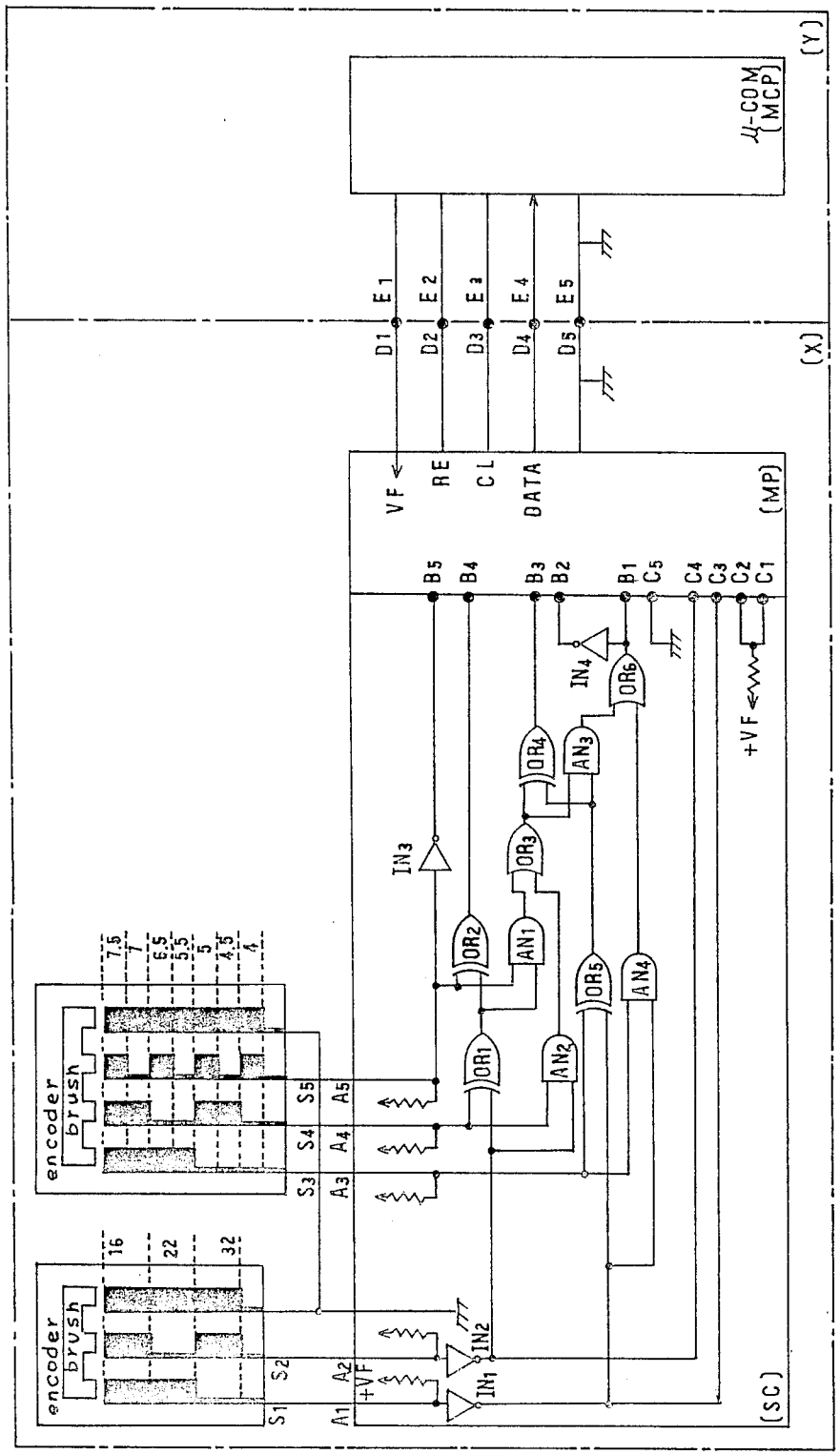
FIG. 2 is a block diagram of a circuit for the converter of FIG. 1 for transmitting data in accordance with the present invention.

A preferred embodiment of the present invention will be described hereinunder with reference to the accompanying drawings in detail. FIG. 1 is an exploded perspective view of a converter in accordance with the present invention, while FIG. 2 is a block diagram of a data conversion/output circuit for use in the converter of FIG. 1.

Referring initially to FIG. 1, the converter preferably has a mount 1 for mounting the converter on the camera body, a mount 7 for mounting an interchangeable lens on the converter, a converter body 3, and a housing 5 which holds conversion mechanisms such as a focus ring 8 for driving a lens barrel 4 and an auto-arm 13 for converting the operation of the auto-lever. A base member 15 fixed to the housing 5 carries a data conversion/output circuit 17 (FIG. 2) which receives, through an encoder 19, the lens data representing the characteristics of the interchangeable lens and outputs the data after it has been converted. A printed circuit board 16 having a contact section 18 is provided on one end of the base member 15. The contact section 18 is adapted to contact with a camera-side contact section fixed to an inner hood 2. An auto-arm 13 having a cam for converting the motion of an auto-lever on the camera body is rotatably held by an arm shaft 21 through an arm collar 20. The auto-arm 13 is adapted to be moved horizontally by an anti-swing member 14. The housing 5 further has a plurality of auto-arm apertures 5.1 so as to adapt to a variety of types having different positions of the auto-arm. A cover plate 6 is adapted to be fixed so as to cover the unnecessary apertures.

Preferably, on the front portion of the housing 5, there are provided members for fixing the interchangeable lens to the mount 7, such as a lock pin 24, a lock button 25 and a lock spring 26. The housing 5 further has a linear groove 5.2 for guiding the lens barrel 4 when the latter moves along the optical axis. The focus ring 8 and the lens barrel 4 are mounted, respectively, outside and inside the housing 5. A focus roller 22 is received in the linear groove 5.2 and in a cam groove 8.1 and is fixed to the lens barrel 4 by means of a roller shaft 23. The lens data representing the characteristics of the interchangeable lens is transmitted to the camera body, and the control of the focusing lens system and the aperture is performed through this arrangement as will be described in greater detail hereinafter. More specifically, the driving power derived from the camera body is transmitted, through a coupling (not shown in the drawing) on the camera body and a lens coupling 9.1, to a driven shaft 9 having a gear 9.2 which meshes with the gear 8.2 on the focus ring 8, whereby the focus ring 8 in turn causes the lens barrel 4, through the intermediary to the focusing roller 22 fixed thereto, to be moved in the direction of the optical axis, while being guided by the cam groove 8.1 of the focus ring 8 and the linear groove 5.2 of the housing 5.

A motion-transmitting cam lever 12 for transmitting motion to an auto-arm 13 is fixed to the auto-ring 10 to which is fixed also an auto-lever 11 which engages with the auto-lever (not shown in the drawing) on the camera body for controlling the aperture of the interchangeable lens. The cam lever 12 is operatively connected to a cam 13.1 on a cam arm 13 which is rotably held by an armshaft 21 through an arm collar 20 for rotation on the housing 5. The cam lever 12 is designed to adapt to the various ranges of operation of the aperture control levers (not shown in the drawing) of a variety of interchangeable lenses.

In driving the lens system of the converter, preferably the interchangeable lens is adjusted for infinity and is then mounted on the mount 7 of the converter body. The converter body is then mounted at its mount 1 on the camera body. As a result, the coupling on the camera body and the coupling on the converter ar coupled to each other. A conventional driving motor in the camera body is actuated in accordance with a signal from the focus detection means which operates in response to the lens data representing the characteristics of the interchangeable lens. The driving power produced by this driving motor is delivered to the coupling on the camera body and then to the coupling 9.1 on the converter, thereby driving the driven shaft 9. In consequence, the gear 9.2 on the driven shaft 9 is rotated s that the focus ring 8 on the outer periphery of the housing 5 is rotated through meshing engagement between the gear 9.2 and the gear 8.2 on the outer periphery of the focus ring 8. The rotation of the focus ring 8 in turn causes the lens barrel 4 in the housing 5 to be moved in the direction of the optical axis, as the focus roller 22 fixed thereto is guided by the cam groove 8.1 and the linear groove 5.2. Thus, the lens barrel which serves as the focusing lens is driven in accordance with the signal from the focus detection means on the camera body, whereby the lens system as a whole is focused automatically.

Describing now in detail how the conversion of the aperture control operation is conducted, it is to be understood that the interchangeable lens which is mounted on the converter is different from the interchangeable lens which is inherently designed to match the camera system and, therefore, the position and range of movement of the auto-lever of the interchangeable lens on the converter are different from those of the interchangeable lens designed to match the camera system. In order to adapt this interchangeable lens to the camera system, therefore, the converter has an auto-ring 10 to which the auto-lever is attached and a cam lever 12 provided on the auto-ring 10, so that the amount of motion is converted by means of the cam 13.1 of the auto-arm 13. Thus, the motion of the auto-lever on the camera body is transmitted to the auto-lever 11 on the converter and then to the cam lever 12 through the auto-ring 10. The end of the cam lever 12 is operatively connected to the cam 13.1 of the auto-arm 13 so that the motion is converted and transmitted through the auto-lever 13.2 to the auto-lever on the interchangeable lens, thereby effecting the aperture control. Thus, the auto-lever on the camera body is engaged with the auto-lever on the converter, so as to enable the aperture control of the auto-lever, by mounting the interchangeable lens on the converter after setting the interchangeable lens to minimum aperture value and then mounting the converter on the camera body.

The conversion of the lens data representing the characteristics of the interchangeable lens is preferably conducted in a manner described hereinbelow. In FIG. 2 which shows a block diagram of a circuit for data transmission, the circuit shown on the left side of a chain line is mounted on the converter X, while the circuit shown on the right side of the chain line is mounted on the camera body Y. The converter X has encoders $S_1$ to $S_5$ for delivering the lens data representing the characteristics of the lens to the members such as the coupler on the aperture ring. Minimum aperture value data are set in the encoders $S_1$ to $S_2$, while the number of aperture value stages between the full aperture value and the minimum aperture value is set in the encoders $S_3$, $S_4$ and $S_5$. The outputs from these groups of encoders are delivered to input terminals $A_1$, $A_2$, $A_3$, $A_4$ and $A_5$ of the data conversion circuit SC. The minimum aperture value data inputted to the input terminals $A_1$, $A_2$ are shown in Table 1, while the data received by the input terminals $A_3$, $A_4$ and $A_5$ are shown in Table 2.

The data conversion/ouput circuit 17 of the converter X, which is preferably intended for converting the read data into signals adaptable to the camera body Y, includes the data conversion circuit SC mentioned above and a data output circuit MP for outputting the converted data to the camera body. In the described embodiment, the data are preferably transmitted to the camera body in a serial bit-by-bit fashion.

The data conversion circuit SC preferably converts the minimum aperture value data from the interchangeable lens into a minimum aperture value signal of 5-bits acceptable to the camera body Y, as shown in Table 3, and delivers the signal to terminals $C_1$ to $C_5$ of the serial data output circuit MP. Then, the full aperture value is preferably computed from the minimum aperture value and the stage number data derived from the interchangeable lens data, in accordance with the following formula (1).

Full Aperture Value = Minimum Aperture Value
− Number of Aperture Stages    (1)

The full aperture value computed in accordance with the formula (1) is converted, as in the case of the minimum aperture value data, into 5-bit serial data acceptable to the camera body Y, as shown in Table 3. The thus obtained data are outputted to terminals $B_1$ to $B_5$ of the serial data output circuit MP.

The logical circuit SC for converting the full aperture value data and the minimum aperture value data acceptable to the camera body 4 will be explained hereinunder with reference to logical expressions represented by formulas (2) and (3).

The logical expression (2) for the conversion of the full aperture value is shown below:

$$B_1 = \{(\overline{A}_2 \oplus A_4) \cdot A_5 + \overline{A}_2 \cdot A_4\} \cdot \overline{A}_1 \oplus A_3 + \overline{A}_1 \cdot A_3$$

$$B_2 = \overline{B}_1$$

$$B_3 = (\overline{A}_2 \oplus A_4(\cdot A_5 + \overline{A}_2 \cdot \overline{A}_4 \oplus (\overline{A}_1 \oplus A_3))$$

$$B_4 = (\overline{A}_2 \oplus A_4 \beta A_5$$

$B_5 = \bar{A}_5$

The logical expression (3) for the conversion of the minimum aperture value is shown below:

$C_1 = 1$ $C_2 = 1$ $C_3 = \bar{A}_1$ $C_4 = \bar{A}_2$ $C_5 = 0$

In these formulas, symbols $\oplus$, $+$ and $\cdot$ represent, respectively, a ring sum, logical sum and logical product.

TABLE 1

Minimum Aperture Value Date of Interchangeable Lens

| MIN. APERTURE VALUE | SET DATA | |
|---|---|---|
| | $A_1$ | $A_2$ |
| 16 | 0 | 0 |
| 22 | 0 | 1 |
| 32 | 1 | 0 |

TABLE 2

Stage Number Data of Interchangeable Lens

| NUMBER OF APERTURE STAGES | SET DATA | | |
|---|---|---|---|
| | $A_3$ | $A_4$ | $A_5$ |
| 7.5 | 0 | 0 | 0 |
| 7 | 0 | 0 | 1 |
| 6.5 | 0 | 1 | 0 |
| 5.5 | 0 | 1 | 1 |
| 5 | 1 | 0 | 0 |
| 4.5 | 1 | 0 | 1 |
| 4 | 1 | 1 | 0 |

TABLE 3

Full/Minimum Aperture Value on Camera Body Side

| FULL APERTURE VALUE | | | | | MIN. APERTURE VALUE | | | | |
|---|---|---|---|---|---|---|---|---|---|
| $B_1$ | $B_2$ | $B_3$ | $B_4$ | $B_5$ | $C_1$ | $C_2$ | $C_3$ | $C_4$ | $C_5$ |
| 1.4 | 0 | 1 | 0 | 1 | 0 | | | | |
| 1.8 | 0 | 1 | 0 | 1 | 1 | | | | |
| 2 | 0 | 1 | 1 | 0 | 0 | | | | |
| 2.5 | 0 | 1 | 1 | 0 | 1 | | | | |
| 2.8 | 0 | 1 | 1 | 1 | 0 | | | | |
| 3.5 | 0 | 1 | 1 | 1 | 1 | | | | |
| 4 | 1 | 0 | 0 | 0 | 0 | | | | |
| 4.5 | 1 | 0 | 0 | 0 | 1 | | | | |
| 5.6 | 1 | 0 | 0 | 1 | 0 | | | | |
| 6.5 | 1 | 0 | 0 | 1 | 1 | | | | |
| 8 | 1 | 0 | 1 | 0 | 0 | | | | |
| 9.5 | 1 | 0 | 1 | 0 | 1 | | | | |
| 11 | 1 | 0 | 1 | 1 | 0 | | | | |
| 13.5 | 1 | 0 | 1 | 1 | 1 | | | | |
| 16 | 1 | 1 | 0 | 0 | 0 | | | | |
| 19 | 1 | 1 | 0 | 0 | 1 | | | | |
| 22 | 1 | 1 | 0 | 1 | 0 | | | | |
| 27 | 1 | 1 | 0 | 1 | 1 | | | | |
| 32 | 1 | 1 | 1 | 0 | 0 | | | | |
| 38 | 1 | 1 | 1 | 0 | 1 | | | | |
| 45 | 1 | 1 | 1 | 1 | 0 | | | | |

The signals and the contents of the data received by the input terminals $A_1$ to $A_5$ of the encoders $S_1$ to $S_5$ provided on the converter X are derived from Tables 1 and 2 as follows:

| | MINIMUM APERTURE VALUE | | NUMBER OF STAGES | | |
|---|---|---|---|---|---|
| PARALLEL INPUT TERMINALS | $A_1$ | $A_2$ | $A_3$ | $A_4$ | $A_5$ |
| SIGNAL CONTENT | 1 | 0 | 1 | 0 | 1 |
| | 22 | | 5 | | |

The signals and the contents shown above are preferably substituted into the logical expressions (2) and (3) for converting the signals received by the input terminals $A_1$ to $A_5$ acceptbale to the camera body, so that the following results are obtained.

| | FULL APERTURE VALUE | | | | | MINIMUM APERTURE VALUE | | | | |
|---|---|---|---|---|---|---|---|---|---|---|
| TERMINAL | $B_1$ | $B_2$ | $B_3$ | $B_4$ | $B_5$ | $C_1$ | $C_2$ | $C_3$ | $C_4$ | $C_5$ |
| SIGNAL | 1 | 0 | 0 | 0 | 0 | 1 | 1 | 0 | 1 | 0 |
| CONTENT | | | 4 | | | | | 22 | | |

Then, the contents in Table 3 are checked against the solutions $B_1$ to $B_5$, $C_1$ to $C_5$ of the formulae (2) and (3), so that the full aperture value and the minimum aperture value are preferably determined as follows:

Full Aperture Value = 4 Minimum Aperture Value = 22

Thus, the lens data representing the characteristics of the interchangeable lens have preferably been converted to signals acceptable to the camera body.

Referring again to FIG. 2, an explanation will now be made as to the manner in which the data is preferably transmitted from the converter to the camera body Y. The terminals $E_1$ to $E_4$ on the camera body Y are connected to a conventional microcomputer ($\mu$-COM)(MCP) which also is provided in the camera body, while a terminal $E_5$, which is a grounding terminal, is connected to the terminal $D_5$ of the converter X. The terminal $E_1$ on the camera body Y is adapted to be connected to a terminal $D_1$ on the converter. The terminal $E_2$ on the camera body Y is adapted to deliver, when the data are being received from the converter X, a signal of "High" level through the terminal $D_2$ of the converter X, so as to prevent the serial data output circuit from being reset.

In order to synchronize the operation of the electric circuits on the converter and the camera body, the terminal $E_3$ on the camera body Y is preferably adapted to transmit clock pulses to the terminal CL of the serial data output circuit MP, through an input terminal $D_3$.

The serial data output circuit MP of the converter X is preferably adapted to deliver, in a serial bit-by-bit manner, the data from the terminals $B_1$ to $B_5$ and $C_1$ to $C_5$ to the camera body Z, through the output terminals (DATA) $D_4$, $E_4$, in synchronize with the rise of each clock pulse. The serial data output circuit MP, which delivers data to the camera body in a bit-by-bit manner in synchronism with the clock pulses, may be of the type disclosed in the specification of commonly owned copending U.S. patent application Ser. No. 925,706, filed Oct. 30, 1986, the contents of which are specifically incorporated by reference herein.

The construction of the data conversion circuit SC and the logical expressions (2) and (3) are only illustrative, and can be designed to meet various lens data (see Tables 1 and 2) and various contents (see Table 3) of data received by the camera body. In some cases, a correction of the full aperture value and the minimum aperture value may be needed depending on the characteristics of the converter. To meet such demands, the data conversion circuit may be modified such that it conducts the correction simultaneously with the conversion.

In the above described embodiment, the lens data representing the characteristics of the interchangeable lens mounted on the converter are preferably automatically inputted by means of encoders. However, some interchangeable lenses do not have means for outputting the lens data externally. In order to adapt the converter to such interchangeable lenses, the converter can have manual setting switches, so that the data are set in the encoders manually through these switches, thus enabling transmission of the lens data to the camera body.

As has been described, the present invention preferably provides a converter which is adapted to connect a camera system having a driving power output member driven by a signal from a focus detection means on the camera body to manual-focus interchangeable lens having a mounting construction different from that of the interchangeable lenses designed to match the camera body, thereby making it possible to conduct autofocus shooting even with the interchangeable lenses which do not have autofocus functions In addition, the converter in accordance with the present invention offers an advantage also from the view point of manufacture in that the converter can be adapted to a variety of types of interchangeable lenses, by preparing a variety of types of the mount 7 for interchangeable lenses, the auto-arm 13, and by changing the cover plate 6, which covers unnecessary ones of a plurality of auto-arm apertures 5.1 formed in the housing 5, an altering the position of the cam lever 12 on the auto-ring 10 such that it can correctly engage with the cam 13.2 of the auto-arm 13.

What is claimed is:

1. An apparatus for converting a manual focus interchangeable lens having an associated focal length into an autofocus type lens for use with a microprocessor based autofocus single lens reflex camera for providing autofocus photography with said manual focus interchangeable lens, said camera having a camera body, said camera body comprising focus detecting means and focus driving means for providing a focus driving signal under control of said focus detecting means, said focus detecting means comprising said microprocessor, said camera body having a lens mounting means for mounting an interchangeable autofocus lens to said camera body in driving relation with said focus driving means and in electrical connection with said focus detecting means for providing lens driving power to said interchangeable autofocus lens in response to a signal from said focus detecting means; said converter apparatus comprising first mounting means disposed at one end thereof for mounting said converter apparatus to said camera body lens mounting means and second mounting means disposed at the opposite end thereof for mounting said manual focus interchangeable lens to said converter apparatus, said manual focus interchangeable lens having an associated camera mounting different from said camera lens mounting, said converter apparatus further comprising a lens system for converting said focal length of said manual focus interchangeable lens, a driving means couplable to said focus driving means in driving engagement therewith for driving said converter lens system along the optical axis thereof in response to said focus driving signal from said camera body, lens data conversion and output means for converting lens data representing the characteristics of said manual focus interchangeable lens into digital representations thereof for electrically providing a bit pattern for transmission of said lens data to said camera body microprocessor through said camera lens mounting means, and aperture control and conversion means for providing aperture control of said interchangeable lens in response to aperture control data derived from said camera body, said lens data conversion and output means comprising means for detecting minimum aperture value of said manual focus interchangeable lens and for providing a full/minimum aperture value lens data characteristic therefrom based on said detected minimum aperture value for said manual focus interchangeable lens.

2. A converter apparatus in accordance with claim 1 wherein said manual focus interchangeable lens has an associated number of aperture value stages between a full aperture value for said lens and said minimum aperture value for said lens, said lens data conversion and output means further comprising means for detecting said associated number of aperture value stages between said full aperture value of said manual focus interchangeable lens and said minimum aperture value of said manual focus interchangeable lens and said minimum aperture value of said manual focus interchangeable lens, said full/minimum aperture value lens data characteristic further being based on said detected associated number of aperture value stages.

3. A converter apparatus in accordance with claim 2 wherein said minimum aperture value detecting means comprises digital encoder means.

4. A converter apparatus in accordance with claim 3 wherein said means for detecting said associated number of aperture value stages comprises digital encoder means.

5. A converter apparatus in accordance with claim 4 wherein said manual focus interchangeable lens comprises an aperture ring for varying said lens aperture, said digital encoder means being operatively associated with said aperture ring.

6. A converter apparatus in accordance with claim 5 wherein said lens data conversion and output means further comprises means for determining said full/minimum aperture value lens data characteristic and for providing said bit pattern corresponding thereto.

7. A converter apparatus in accordance with claim 6 wherein said bit pattern providing means comprises means for providing a serial bit pattern as said bit pattern.

8. A converter apparatus in accordance with claim 1 wherein said minimum aperture value detecting means comprises digital encoder means 9. A converter apparatus in accordance with claim 8 wherein said manual focus interchangeable lens comprises an aperture ring for varying said lens aperture, said digital encoder means being operatively associated with said aperture ring.

10. A converter apparatus in accordance with claim 9 wherein said lens data conversion and output means further comprises means for determining said full- /minimum aperture value lens data characteristic and for providing said bit pattern corresponding thereto.

11. A converter apparatus in accordance with claim 10 wherein said bit pattern providing means comprises means for providing a serial bit pattern as said bit pattern.

12. A converter apparatus in accordance with claim 1 wherein said lens data conversion and output means further comprises means for determining said full-/minimum aperture value lens data characteristic and for providing said bit pattern corresponding thereto.

13. A converter apparatus in accordance with claim 12 wherein said bit pattern providing means comprises means for providing a serial bit pattern as said bit pattern.

14. A converter apparatus in accordance with claim 2 wherein said means for detecting said associated number of aperture value stages comprises digital encoder means.

15. A converter apparatus in accordance with claim 14 wherein said manual focus interchangeable lens comprises an aperture ring for varying said lens aperture, said digital encoder means being operatively associated with said aperture ring.

* * * * *